US008285471B2

(12) United States Patent
Sugiyama et al.

(10) Patent No.: US 8,285,471 B2
(45) Date of Patent: Oct. 9, 2012

(54) DATA STORAGE DEVICE

(75) Inventors: Kouichi Sugiyama, Chiryu (JP); Koji Ishizuka, Chita-gun (JP)

(73) Assignee: Denso Corporation, Kariya (JP)

( * ) Notice: Subject to any disclaimer, the term of this patent is extended or adjusted under 35 U.S.C. 154(b) by 231 days.

(21) Appl. No.: 12/814,777

(22) Filed: Jun. 14, 2010

(65) Prior Publication Data

US 2010/0324803 A1    Dec. 23, 2010

(30) Foreign Application Priority Data

Jun. 19, 2009    (JP) ................. 2009-147014

(51) Int. Cl.
G06F 11/30    (2006.01)
G06F 17/40    (2006.01)
(52) U.S. Cl. ........ 701/106; 701/114; 701/115; 123/447; 702/182; 702/187
(58) Field of Classification Search .......... 702/182, 702/187; 123/463, 445, 446, 447, 198 D, 123/295, 299, 304, 305, 674; 701/101, 102, 701/103, 104, 105, 106, 107, 114, 115; 73/114.43, 73/114.48, 114.51
See application file for complete search history.

(56) References Cited

U.S. PATENT DOCUMENTS

| 5,745,864 | A | 4/1998 | Hosoe et al. | |
| 6,102,000 | A * | 8/2000 | Shindoh et al. | 123/381 |
| 7,007,662 | B2 * | 3/2006 | Sakai et al. | 123/299 |
| 7,273,039 | B2 | 9/2007 | Ohno et al. | |
| 7,523,723 | B2 * | 4/2009 | Marriott et al. | 123/1 A |
| 2008/0236548 | A1 | 10/2008 | Iihoshi et al. | |
| 2009/0056676 | A1 | 3/2009 | Nakata et al. | |
| 2009/0056677 | A1 | 3/2009 | Nakata et al. | |
| 2009/0056678 | A1 | 3/2009 | Nakata et al. | |
| 2009/0063011 | A1 | 3/2009 | Nakata et al. | |

FOREIGN PATENT DOCUMENTS

| JP | P2002-304215 A | 10/2002 |
| JP | 2005-048659 | 2/2005 |
| JP | 2005-248722 | 9/2005 |
| JP | P2008-144749 A | 6/2008 |
| JP | 2008-215201 | 9/2008 |

(Continued)

OTHER PUBLICATIONS

Japanese Office Action dated Apr. 19, 2011, issued in corresponding Japanese Application No. 2009-147014 with English Translation.

(Continued)

*Primary Examiner* — Stephen K Cronin
*Assistant Examiner* — Raza Najmuddin
(74) *Attorney, Agent, or Firm* — Nixon & Vanderhye PC

(57) ABSTRACT

Data indicating a sudden change in a bulk modulus of fuel and data indicating a usage state and a usage environment of an injector as of occurrence of an injection abnormality are stored in EEPROM mounted in the injector. Thus, it can be analyzed whether a cause of a defect such as the injection abnormality is use of inferior fuel based on the data related to the bulk modulus. In addition, it can be analyzed whether the cause of the defect such as the injection abnormality is a severe usage state and a severe usage environment based on the data related to the usage state and the usage environment. Thus, the data useful for analyzing the cause of the defect related to the fuel injection can be provided.

3 Claims, 4 Drawing Sheets

FOREIGN PATENT DOCUMENTS

| | | |
|---|---|---|
| JP | P2008-240532 A | 10/2008 |
| JP | P2009-074535 A | 4/2009 |

OTHER PUBLICATIONS

U.S. Appl. No. 12/817,266, Yamada et al, filed Jun. 17, 2010.
U.S. Appl. No. 12/796,890, Komatsu, filed Jun. 9, 2010.
U.S. Appl. No. 12/813,731, Yamada, filed Jun. 11, 2010.
U.S. Appl. No, 12/797,070, Yoshida, filed Jun. 9, 2010.
U.S. Appl. No. 12/796,904, Sugiyama et al, filed Jun. 9, 2010.
U.S. Appl. No. 12/817,286, Nakata et al, filed Jun. 17, 2010.
U.S. Appl. No. 12/796,845, Takashima, filed Jun. 9, 2010.
Japanese Office Action dated Jul. 10, 2012, issued in corresponding Japanese Application No. 2011-130514, with English translation.

\* cited by examiner

DATA STORAGE DEVICE

CROSS REFERENCE TO RELATED APPLICATION

This application is based on and incorporates herein by reference Japanese Patent Application No. 2009-147014 filed on Jun. 19, 2009.

BACKGROUND OF THE INVENTION

1. Field of the Invention

The present invention relates to a data storage device that provides various types of data related to an injector of an internal combustion engine.

2. Description of Related Art

There is a case where an injector, for example as described in Patent document 1 (JP-A-2009-74536), causes defects such as an inability to inject a desired quantity of fuel. The defects can occur not only because the injector reaches its lifetime but because of other various types of causes. For example, the defects can occur when inferior fuel is used, when the injector is used in a state where an engine operation state becomes a high-load state for a moment, or when the injector is used in a high-load range frequently.

Therefore, replacement of the injector does not suffice when a problem exists in a usage environment, a usage state of the injector or the like. It has been required to examine and analyze the causes of the defects related to the fuel injection.

SUMMARY OF THE INVENTION

It is an object of the present invention to provide a data storage device aiming to provide data useful for analyzing causes of defects related to fuel injection.

It is another object of the present invention to provide a data storage device aiming to provide data useful for learning a degradation state of an injector.

According to a first example aspect of the present invention, a data storage device has a calculating section for calculating a bulk modulus of fuel injected from an injector of an internal combustion engine, a determining section for determining whether a change amount of the calculated bulk modulus per unit time increases and exceeds a predetermined amount, and a storing section for storing a determination result of the determining section or a value of the bulk modulus.

When it is found that the bulk modulus of the fuel has changed largely, it can be found that the property of the fuel has changed. In such the case, there is a high possibility that inferior fuel was used. According to the above-described aspect of the present invention taking this point into account, the storing section stores the determination result (data) of whether the change amount of the bulk modulus per unit time increases and exceeds the predetermined amount or the value of the bulk modulus (data). Therefore, for example, when the defect such as the inability to inject the desired quantity of the fuel arises, the above-described data can be effectively used for analyzing whether the cause of the defect is the use of the inferior fuel.

The bulk modulus is a coefficient K that satisfies a relational expression: $\Delta P = K \cdot \Delta V / V$ at the time when pressure and a volume of the fuel change. In the relational expression, K represents the bulk modulus, $\Delta P$ is a pressure change amount accompanying a volume change of the fuel, V is a volume of a fuel passage, and $\Delta V$ is a volume change amount of the fuel passage.

According to a second example aspect of the present invention, the data storage device further has a learning section for learning a characteristic value, which indicates an injection characteristic of the injector and which takes different values according to the bulk modulus of the actual fuel. The storing section stores the determination result of the determining section or the value of the bulk modulus at the time when a change amount of the characteristic value per unit time increases and exceeds a predetermined amount.

When the characteristic value, which takes different values according to the bulk modulus, changes largely, there is a high possibility that the cause of the change is change of a property of the fuel. Therefore, when the characteristic value changes largely and the determining section determines that the bulk modulus changes largely, there is a high possibility that the inferior fuel is used. According to the above-described aspect of the present invention taking this point into account, the storing section stores the determination result of the determining section or the value of the bulk modulus at the time when the change amount of the characteristic value per unit time increases and exceeds the predetermined amount. Therefore, the determination result stored by the storing section becomes more useful data for analyzing whether the cause of the defect is the use of the inferior fuel.

An example of the characteristic value is an injection quantity of the fuel with respect to a time of a valve opening command for commanding the injector to open and to perform the injection.

According to a third example aspect of the present invention, the data storage device is applied to the internal combustion engine that injects the fuel, which is distributed from a pressure accumulator, from an injection hole of the injector. The data storage device further has a fuel pressure sensor arranged in a fuel passage extending from a discharge port of the pressure accumulator to the injection hole for sensing fuel pressure. The calculating section calculates the bulk modulus, which is used by the determining section, based on the sensed pressure sensed with the fuel pressure sensor.

The fuel pressure decreases with the injection of the fuel. By sensing a waveform of the fuel pressure during the decrease, a decrease amount of the fuel pressure and the injection quantity from injection start timing to injection end timing can be calculated. The decrease amount is equivalent to $\Delta P$ (pressure change amount accompanying volume change of fuel). The injection quantity is equivalent to $\Delta V$ (volume change amount of fuel passage). Since V (volume of fuel passage) is a value that is decided uniquely and that does not change, a value measured beforehand may be used as V. Therefore, by calculating and obtaining the decrease amount $\Delta P$ and the injection quantity $\Delta V$ from the sensed pressure of the fuel pressure sensor, the bulk modulus K can be calculated based on the expression: $\Delta P = K \cdot \Delta V / V$ mentioned above.

According to the above-described aspect of the present invention taking this point into account, the bulk modulus K is calculated based on the sensed pressure sensed with the fuel pressure sensor. Therefore, the bulk modulus K can be calculated with high accuracy.

According to a fourth example aspect of the present invention, a data storage device has a storing section for storing at least one of a usage state and a usage environment of an injector of an internal combustion engine at the time when occurrence of an abnormality in the injector is detected.

When the injector is used in a severe state or under a severe environment, there is a possibility that the injector breaks down due to such the severe state or the severe environment. According to the above-described aspect of the present invention taking this point into account, the storing section stores the usage state and the usage environment of the injector as of the occurrence of the abnormality as the usage data. Therefore, for example, when the defect such as the inability to inject the desired quantity of the fuel arises, the above-described usage data can be effectively used for analyzing whether the cause of the defect is the severe usage state or the severe usage environment.

Regarding the usage state, according to a fifth example aspect of the present invention, the storing section stores a cumulative operation time or a cumulative operation time number of the injector until the occurrence of the abnormality is detected as the usage state. It can be determined that the injector has been used in a state closer to an endurance limit as the cumulative operation time or the cumulative operation time number increases. Therefore, according to the above-described aspect of the present invention, the stored data of the cumulative operation time or the cumulative operation time number can be effectively used for analyzing whether the cause of the defect is the endurance limit.

Regarding the usage state, according to a sixth example aspect of the present invention, the storing section stores a use frequency of the injector until the occurrence of the abnormality is detected as the usage state for each of a plurality of segmented operation areas of the internal combustion engine. The plurality of segmented operation areas are defined by engine rotation speed or an engine load of the internal combustion engine. For example, there is a case where high use frequency in a high-rotation-speed area or a high-load area is the cause of the defect. Therefore, according to the above-described aspect of the present invention, the stored data of the use frequency can be effectively used for analyzing the cause of the defect.

Regarding the usage environment, according to a seventh example aspect of the present invention, the storing section stores at least one of fuel pressure, engine rotation speed and a fuel injection quantity at the time when the occurrence of the abnormality is detected as the usage environment. When the abnormality arises, there is a case where the instantaneous increase of at least one of the fuel pressure, the engine rotation speed and the fuel injection quantity is the cause of the defect. Therefore, according to the above-described aspect of the present invention, the stored data can be effectively used for analyzing the cause of the defect.

According to an eighth example aspect of the present invention, a data storage device has a storing section for storing at least one of a cumulative operation time of an injector of an internal combustion engine from a first use of the injector and a transition of a degradation quantitative value correlated with a degradation state of the injector.

In order to control the injector into a desired injection state (e.g., actual injection start timing, actual injection quantity and the like), it is necessary to perform the control in consideration of a degradation state of the injector. Therefore, there is a case where a degradation quantitative value correlated with the degradation state (for example, delay since injection is commanded until injection is actually started) is sensed and learned, and the operation of the injector is controlled in consideration of the learning value. In this case, when a transition of the degradation quantitative value (learning value) is a transition of a rapid change, it is necessary to increase the sensing frequency of the degradation quantitative value (i.e., learning frequency). That is, it is necessary to advance the next learning timing. In an early stage of the use of the injector in which the cumulative operation time is short, it is anticipated that the transition of the degradation quantitative value changes rapidly. Therefore, it is necessary to increase the sensing frequency during the early stage of the use of the injector.

According to the above-described aspect of the present invention taking these points into account, the storing section stores at least one of the cumulative operation time from the first use of the injector and the transition of the degradation quantitative value. Therefore, when the degradation quantitative value used for the fuel injection control is obtained, the data of the cumulative operation time and the transition of the degradation quantitative value can be effectively used for deciding the sensing frequency of the degradation quantitative value (i.e., learning frequency).

According to a ninth example aspect of the present invention, the data storage device is used in the internal combustion engine having a plurality of cylinders having the injectors. The storing section performs the storing for each of the injectors. Thus, when one injector is replaced, uniform increase of the learning frequencies of all the injectors on the assumption that all the injectors are in the early stage of the use can be avoided. According to the present invention, the learning frequency can be decided according to the state of each injector. Therefore, deficiency and excess of the learning frequency can be avoided.

According to a tenth example aspect of the present invention, the storing section performs the storing into a storage mounted in the injector.

It is common to control the operation of the injector by a control unit (ECU) provided in a place different from the injector. If the above-described various data are stored in the ECU, a defect analysis worker who received the injector causing the defect cannot obtain the various data unless the worker receives also the ECU. Therefore, workability is low in this case. As contrasted thereto, the storing section according to the present invention stores the various data useful for the defect cause analysis and the various data useful for deciding the learning frequency in the storage mounted in the injector. Accordingly, the defect analysis worker can obtain the various data without necessitating the reception of the ECU, thereby improving the workability of the analysis.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Hereafter, an embodiment of a data storage device according to the present invention will be described with reference to the drawings. The data storage device according to the present embodiment is mounted in an engine (internal combustion engine) for a vehicle. A diesel engine that injects high-pressure fuel and causes compression self-ignition combustion of the fuel in multiple cylinders #1-#4 is assumed as the engine according to the present embodiment.

Figure 1:
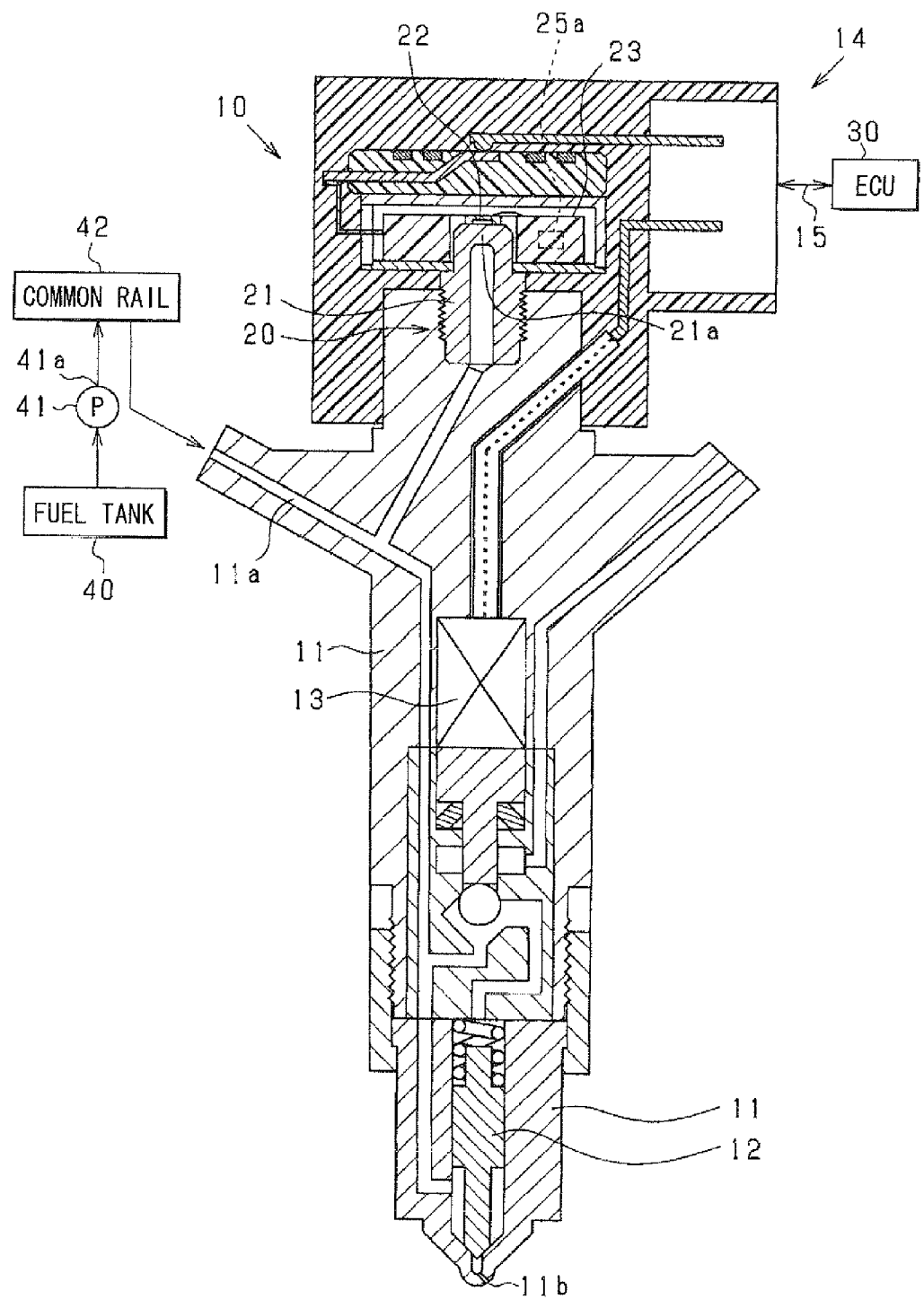
FIG. 1 is a diagram schematically showing a fuel injection system of an internal combustion engine having a data storage device according to an embodiment of the present invention.

FIG. 1 is a schematic diagram showing an injector 10 mounted in each cylinder of the engine, a fuel pressure sensor 20 mounted in the injector 10, EEPROM 25a (storage) mounted in the fuel pressure sensor 20, an ECU 30 as an electronic control unit mounted in the vehicle and the like.

First, a fuel injection system of the engine including the injector 10 will be explained. The fuel in a fuel tank 40 is pumped by a high-pressure pump 41 into a common rail 42 (pressure accumulator) and is accumulated in the common rail 42. The accumulated fuel is distributed and supplied to the injectors 10 of the respective cylinders.

The injector 10 has a body 11, a needle 12 (valve member), an actuator 13 and the like as explained below. The body 11 defines a high-pressure passage 11a inside and an injection hole 11b for injecting the fuel. The needle 12 is accommodated in the body 11 and opens and closes the injection hole 11b. The actuator 13 causes the needle 12 to perform the opening-closing operation.

The ECU 30 controls drive of the actuator 13 to control the opening-closing operation of the needle 12. Thus, the high-pressure fuel supplied from the common rail 42 to the high-pressure passage 11a is injected from the injection hole 11b in accordance with the opening-closing operation of the needle 12. For example, the ECU 30 calculates injection modes such as injection start timing, injection end timing and an injection quantity based on rotation speed of an engine output shaft, an engine load and the like. The ECU 30 controls the drive of the actuator 13 to realize the calculated injection modes.

Next, a hardware construction of the fuel pressure sensor 20 will be explained.

The fuel pressure sensor 20 has a stem 21 (strain element), a pressure sensor element 22, a mold IC 23 and the like as explained below. The stem 21 is fixed to the body 11. A diaphragm section 21a formed in the stem 21 receives pressure of the high-pressure fuel flowing through the high-pressure passage 11a and deforms elastically.

The pressure sensor element 22 is fixed to the diaphragm section 21a. The pressure sensor element 22 outputs a pressure sensing signal according to an amount of the elastic deformation caused in the diaphragm section 21a.

The mold IC 23 is formed by molding electronic components such as an amplifying circuit that amplifies the pressure sensing signal outputted from the pressure sensor element 22 and the EEPROM 25a (storage) as a rewritable nonvolatile memory with a resin. The mold IC 23 is mounted in the injector 10 together with the stem 21.

A connector 14 is provided in an upper portion of the body 11. The mold IC 23 and the actuator 13 are electrically connected with the ECU 30 through a harness 15 connected to the connector 14.

If the fuel injection from the injection hole 11b is started, the pressure of the fuel (fuel pressure) in the high-pressure passage 11a decreases. If the fuel injection ends, the fuel pressure increases. That is, the change of the fuel pressure is correlated with a change of an injection rate (injection quantity injected per unit time). It can be said that the injection rate change can be estimated from the fuel pressure change. If the injection rate change can be estimated, various control parameters (equivalent to characteristic data) used for fuel injection control can be obtained and learned. Hereafter, the above-described control parameters, which can be obtained from the injection rate change, will be explained with reference to FIG. 2.

Figure 2:
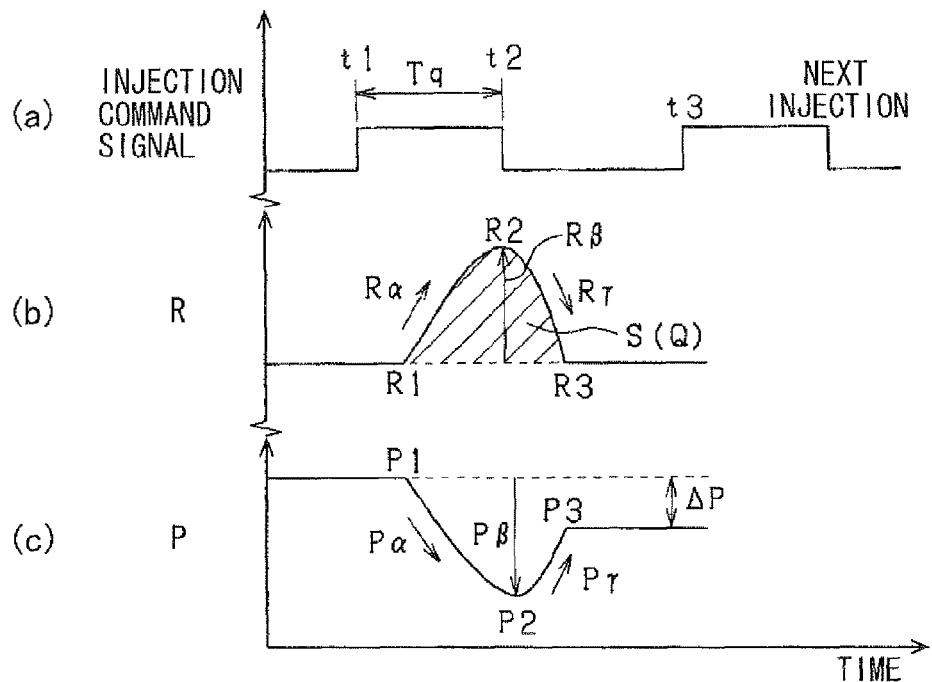
FIG. 2 is a time chart showing an injection command signal, an injection rate and sensed pressure according to the embodiment.

Part (a) of FIG. 2 shows an injection command signal outputted from the ECU 30 to the actuator 13 of the injector 10. Due to pulse-on (i.e., rising) of the command signal, the actuator 13 operates and the injection hole 11b opens. That is, an injection start is commanded at pulse-on timing t1 of the injection command signal, and an injection end is commanded at pulse-off timing t2. Therefore, an injection quantity Q is controlled by controlling a valve opening time Tq of the injection hole 11b with a pulse-on period (i.e., injection command period) of the command signal.

Part (b) of FIG. 2 shows change (transition) of the fuel injection rate R from the injection hole 11b occurring with the above-described injection command. Part (c) of FIG. 2 shows change (fluctuation waveform) of the sensed pressure P occurring with the change of the injection rate R. The fluctuation of the sensed pressure P is correlated with the change of the injection rate R as explained below. Therefore, a transition waveform of the injection rate R can be estimated from the fluctuation waveform of the sensed pressure P.

That is, after the timing t1 when the injection start command is outputted as shown in part (a) of FIG. 2, the injection rate R starts increasing at timing R1 and the injection is started. As the injection rate R starts increasing at the timing R1, the sensed pressure P starts decreasing at a changing point P1. Then, as the injection rate R reaches the maximum injection rate at timing R2, the decrease of the sensed pressure P stops at a changing point P2. Then, as the injection rate R starts decreasing at timing R2, the sensed pressure P starts increasing at a changing point P2. Then, as the injection rate R becomes zero and the actual injection ends at timing R3, the increase of the sensed pressure P stops at a changing point P3.

Thus, the increase start timing R1 (actual injection start timing) and the decrease end timing R3 (actual injection end timing) of the injection rate R can be calculated by detecting the changing points P1 and P3 in the fluctuation of the sensed pressure P sensed by the fuel pressure sensor 20. Moreover, the change of the injection rate R can be estimated from the fluctuation of the sensed pressure P based on the correlation between the fluctuation of the sensed pressure P and the change of the injection rate R as explained below.

That is, there is a correlation between a pressure decrease rate Pα from the changing point P1 to the changing point P2 of the sensed pressure P and an injection rate increase rate Rα from the changing point R1 to the changing point R2 of the injection rate R. There is a correlation between a pressure increase rate Pγ from the changing point P2 to the changing point P3 and an injection rate decrease rate Rγ from the changing point R2 to the changing point R3. There is a correlation between a pressure decrease amount Pβ (maximum drop amount) from the changing point P1 to the changing point P2 and an injection rate increase amount Rβ from the changing point R1 to the changing point R2. Accordingly, the injection rate increase rate Rα, the injection rate decrease rate Rγ, and the injection rate increase amount Rβ of the injection rate R can be calculated by sensing the pressure decrease rate Pα, the pressure increase rate Pγ, and the pressure decrease amount Pβ from the fluctuation of the sensed pressure P. As described above, the various states R1, R3, Rα, Rβ and Rγ of the injection rate R can be calculated, and eventually, the change (transition waveform) of the fuel injection rate R shown in part (b) of FIG. 2 can be estimated.

An integration value of the injection rate R from the actual injection start to the actual injection end (i.e., shaded area indicated by mark S in part (b) of FIG. 2) corresponds to the injection quantity. An integration value of the pressure P in a portion of the fluctuation waveform of the sensed pressure P corresponding to the change of the injection rate R from the actual injection start to the actual injection end (i.e., portion from changing point P1 to changing point P3) is correlated with the integration value S of the injection rate R. Therefore, the injection rate integration value S equivalent to the injection quantity Q can be calculated by calculating the pressure integration value from the fluctuation of the sensed pressure P.

Relationships between the pulse-on timing t1, the pulse-off timing t2 and the pulse-on period Tq of the injection command signal and the various states R1, R3, Rα, Rβ, Rγ and the injection quantity Q are stored and updated in the EEPROM 25a (storage) as characteristic values indicating a degradation state of the injector 10, thereby performing learning. The ECU 30 at the time when performing the learning corresponds to a learning section.

More specifically, td, te, dqmax and the like explained below are learned as characteristic values. That is, a time from the pulse-on timing t1 to the actual injection start timing R1 is learned as an injection start response delay td. A deviation between the valve opening time Tq based on the injection command and an actual injection time from R1 to R3 is learned as an injection time deviation te. A ratio between the valve opening time Tq based on the injection command and the injection rate increase amount Rβ is learned as an increase amount ratio dqmax. For example, if the degradation of the injector 10 progresses, there occur tendencies that the injection start response delay td lengthens and the injection time deviation te increases, for example.

The microcomputer of the ECU 30 calculates a request injection quantity and request injection timing fundamentally based on an engine load calculated from an accelerator operation amount and the like, engine rotation speed and the like. Then, the microcomputer sets the injection command signals t1, t2, Tq to satisfy the request injection quantity and the request injection timing by using an injection rate model calculated from the learned characteristic values. Thus, the microcomputer controls the fuel injection state (injection timing, injection quantity and the like).

There is a case where a defect such as an inability to inject desired quantity of fuel occurs. Various data useful for analyzing the cause of the defect are stored in the EEPROM 25a according to the present embodiment. For example, the defect can be caused when the degradation of the injector 10 progresses significantly because inferior fuel is used, when the injector 10 is used in a severe state, or when the injector 10 is used under a severe environment. Hereafter, contents of the various data that are stored will be explained.

(Data Used for Analysis of Use of Inferior Fuel)

Figure 3:
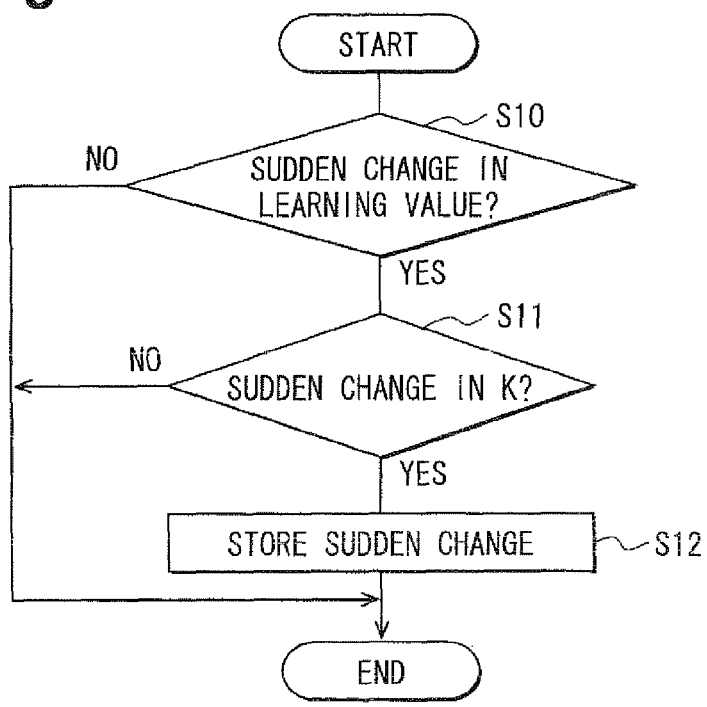
FIG. 3 is a flowchart illustrating storing processing of a bulk modulus according to the embodiment.
Figure 4:
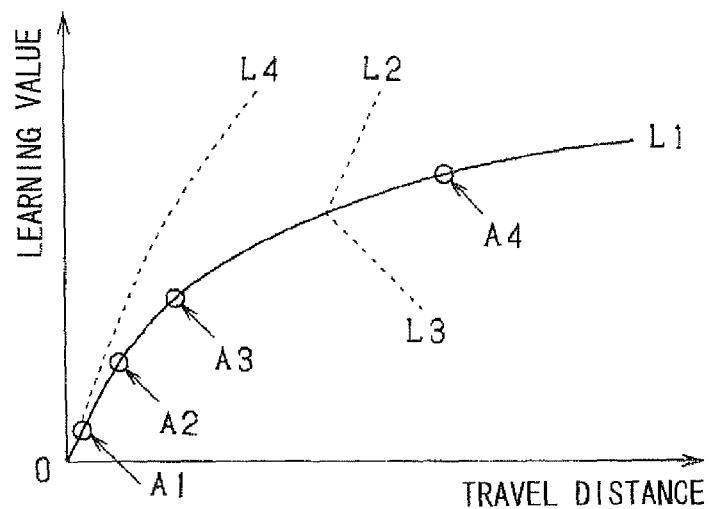
FIG. 4 is a diagram showing a transition of a learning value according to the embodiment.

FIG. 3 shows processing repeatedly performed by the microcomputer of the ECU 30. First in S10 (S means "Step"), it is determined whether the characteristic value (learning value) learned as described above changes suddenly. The sudden change of the characteristic value will be explained with reference to FIG. 4. A horizontal axis of FIG. 4 shows a travel distance of the vehicle and is equivalent to a time of use of the injector or a time number of use of the injector. A vertical axis of FIG. 4 shows the learning value. Increase in the learning value indicates progression of the degradation. A solid line L1 in FIG. 4 shows an actual degree of the progression of the degradation. Solid line L1 indicates that progression speed of the degradation is high in an early stage of the use. Therefore, in the present embodiment, the learning is performed more frequently in the early stage of the use where the degradation progression speed is high (e.g., period until travel distance reaches 100 km) than in a later period. For example, the learning is performed at each 100 km in the early stage, and the learning is performed at each 500 km after the early stage. Marks A1, A2 and A3 in FIG. 4 indicate learning points in the early stage. Mark A4 in FIG. 4 shows a learning point after the early stage.

However, if the learning value deviates from the normally-assumed degradation progression degree L1 due to a certain cause (refer to dotted lines L2, L3 and L4), the setting of the learning timing is changed to shorten the learning interval and to increase the learning frequency. Examples of the cause of the deviation are as follows.

When the existence/nonexistence of the sudden change in the characteristic value is determined in S10, it may be determined that the characteristic value changes suddenly when a change amount of the learned characteristic value per unit time (i.e., gradient of L1-L4) increases and exceeds a predetermined amount. Alternatively, it may be determined that the characteristic value changes suddenly when the actual learning value deviates from the assumed value L1 by at least a predetermined amount by making a transition as shown by the dotted line L2, L3 or L4.

If it is determined that the learning value does not change suddenly in S10, the processing of FIG. 3 is ended. If it is determined that the learning value changes suddenly, it is determined whether a bulk modulus K at the time changes suddenly in following S11. If it is determined that the bulk modulus K does not change suddenly in S11, the processing of FIG. 3 is ended. If it is determined that the bulk modulus K changes suddenly, the occurrence of the sudden change in the bulk modulus K is stored in the EEPROM 25a in following S12. Hereafter, a calculation method of the bulk modulus K will be explained.

The bulk modulus K is a bulk modulus of the fuel in the entire fuel supply route extending from a discharge port 41a of the high-pressure pump 41 to the injection holes 11b of the respective injectors 10. The bulk modulus K is a coefficient K that satisfies a relational expression about a pressure change in a certain fluid: $\Delta P = K \cdot \Delta V/V$. In the relational expression, K represents the bulk modulus, $\Delta P$ is a pressure change amount accompanying a volume change of the fluid, V is a volume, and $\Delta V$ is a volume change amount from the volume V. The reciprocal of the coefficient K is equivalent to a compression ratio.

Next, a procedure of the calculation of the bulk modulus K performed by the microcomputer provided in the ECU 30 will be explained. First, the sensed pressure P sensed with the fuel pressure sensor 20 is obtained. Then, the decrease amount $\Delta P$ of the fuel pressure P occurring with a single injection is calculated from the fluctuation waveform (refer to part (c) of FIG. 2) indicating the transition of the obtained sensed pressure P. More specifically, the decrease amount $\Delta P$ of the fuel pressure P occurring from the injection start timing to the injection end timing is calculated by subtracting the sensed pressure P as of the changing point P3 from the sensed pressure P as of the changing point P1.

Then, the injection quantity Q is calculated from the fluctuation waveform. More specifically, as mentioned above, the transition waveform of the injection rate R shown in part (b) of FIG. 2 is calculated from the fluctuation waveform shown in part (c) of FIG. 2. An integration value S (injection quantity Q) of the injection rate R from the actual injection start to the actual injection end is calculated using the transition waveform.

Then, the bulk modulus K is calculated based on the calculated decrease amount ΔP and the calculated injection quantity Q. More specifically, ΔP in the above-described relational expression (ΔP=K·ΔV/V) is equivalent to the decrease amount ΔP, and ΔV is equivalent to the injection quantity Q. A value that is measured beforehand and stored in a memory (not shown) of the ECU 30 or the EEPROM 25a is used as V. The bulk modulus K is calculated by substituting the decrease amount ΔP, the injection quantity Q (ΔV) and the measurement value V into the above-described relational expression. The ECU 30 at the time when calculating the bulk modulus K in this way corresponds to a calculating section.

When the existence/nonexistence of the sudden change in the bulk modulus K is determined in S11, it may be determined that the bulk modulus K changes suddenly when a change amount of the calculated bulk modulus K per unit time increases and exceeds a predetermined amount. Alternatively, it may be determined that the bulk modulus K changes suddenly when the calculated bulk modulus K deviates from an assumed value by at least a predetermined amount.

In the flowchart of FIG. 3, the determination result of the existence/nonexistence of the sudden change in the bulk modulus K is stored in the EEPROM 25a. Alternatively, the processing of S11 may be abolished, and the bulk modulus K at the time when the learning value changes suddenly may be stored in the EEPROM 25a.

If inferior fuel is used, the bulk modulus K changes largely as compared to the normal fuel. If the bulk modulus K changes, the various characteristic values (learning values) mentioned above also change largely, and the characteristic values take values outside an assumed range as shown by the dotted lines L2, L3 and L4. Therefore, when the defect such as the inability to inject the desired quantity of the fuel occurs, a worker who analyzes the cause of the defect can determine the existence/nonexistence of a record of the sudden change of the bulk modulus K by checking the data stored in the EEPROM 25a. That is, the worker can obtain a record of existence/nonexistence of the use of the inferior fuel by checking the data stored in the EEPROM 25a. Therefore, when the above-mentioned defect arises, the above-described data can be effectively used for analyzing whether the cause of the defect is the use of the inferior fuel.

(Data Used for Analysis of Usage State and Usage Environment of Injector)

Figure 5:
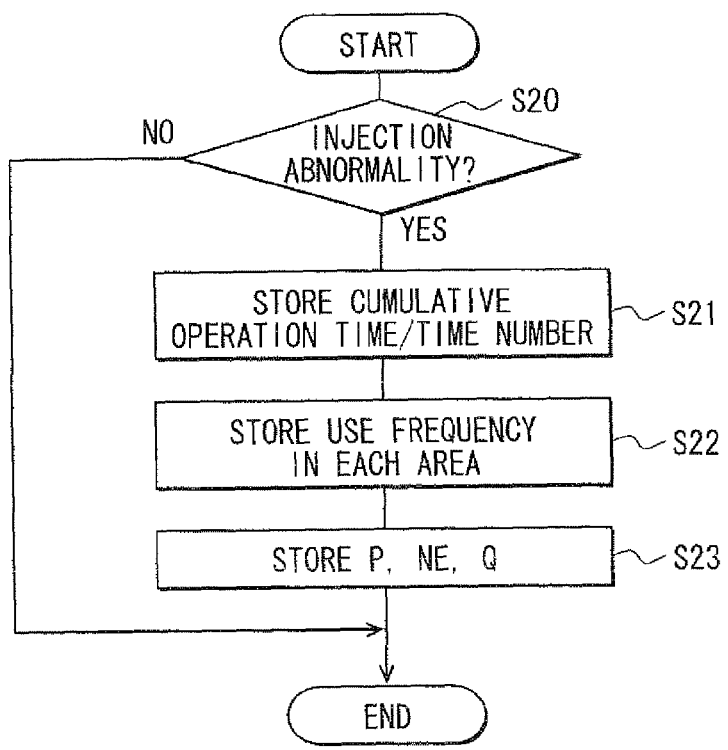
FIG. 5 is a flowchart illustrating storing processing of a usage state and a usage environment of the injector according to the embodiment.

FIG. 5 shows processing repeatedly performed by the microcomputer of the ECU 30. First in S20, it is determined whether the injection abnormality such as the inability to inject the desired quantity of the fuel exists. For example, it may be determined that the injection abnormality exists when a state, in which the injection quantity calculated from the sensed pressure P sensed with the fuel pressure sensor 20 deviates from a target injection quantity by at least a predetermined quantity, continues for a predetermined time or longer. Alternatively, it may be determined that the injection abnormality exists when a state, in which an output of the internal combustion engine deviates from a target output by at least a predetermined amount, continues for a predetermined time or longer. The output of the internal combustion engine may be calculated from an instantaneous value of the engine rotation speed NE.

If it is determined that the injection abnormality does not exist in S20, the processing of FIG. 5 is ended. If it is determined that the injection abnormality exists, a cumulative operation time or a cumulative operation time number of the injector 10 since the injector 10 was used for the first time until the occurrence of the injection abnormality was detected is stored in the EEPROM 25a as the usage state of the injector 10 in following S21.

Figure 6:
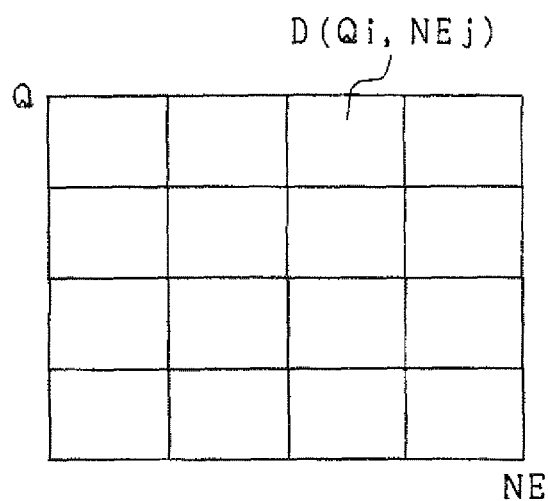
FIG. 6 is a diagram showing a map for storing a use frequency according to the embodiment.

In following S22, use frequency (usage state) of the injector 10 since the injector 10 was used for the first time until the occurrence of the injection abnormality was detected is stored in the EEPROM 25a for each of areas explained below. FIG. 6 shows a map segmenting the engine rotation speed NE and the engine load (equivalent to fuel injection quantity Q) into multiple areas. The use frequency D(Qi, NEj) of the injector 10 is stored in each of areas in the map. Thus, the use frequencies in the respective areas are stored as the data of the usage state indicating the areas of the high use frequencies.

In following S23, the fuel pressure P, the engine rotation speed NE and the engine load (equivalent to fuel injection quantity Q) at the time when the occurrence of the injection abnormality was detected are stored in the EEPROM 25a as the data of the usage environment.

When the injector 10 is used in a severe state or under a severe environment, there is a case where the injector 10 breaks down due to the severe state or the severe environment, thereby accelerating the degradation significantly. An example of the use in the severe state is a case where the injector 10 is used for a long period of time past its service life. Therefore, when the injection abnormality occurs, the data of the cumulative operation time or the cumulative operation time number stored in S21 can be effectively used to analyze whether the cause of the injection abnormality is the severe usage state.

Another example of the use in the severe state is a case where the injector 10 is used frequently in a high-load and high-speed operation area. Therefore, when the injection abnormality occurs, the data of the use frequencies in the respective areas stored in S22 can be effectively used to analyze whether the cause of the injection abnormality is the severe usage state.

An example of the use under the severe environment is a case where the fuel pressure in the injector 10 exceeds allowable pressure for a moment or a case where the engine load Q and the engine rotation speed NE exceed allowable values for a moment. Therefore, when the injection abnormality occurs, the data of the fuel pressure P, the engine rotation speed NE and the fuel injection quantity Q as of the occurrence of the injection abnormality stored in S23 can be effectively used to analyze whether the cause of the injection abnormality is the severe usage environment.

(Data Used for Deciding Learning Timing)

Figure 7:
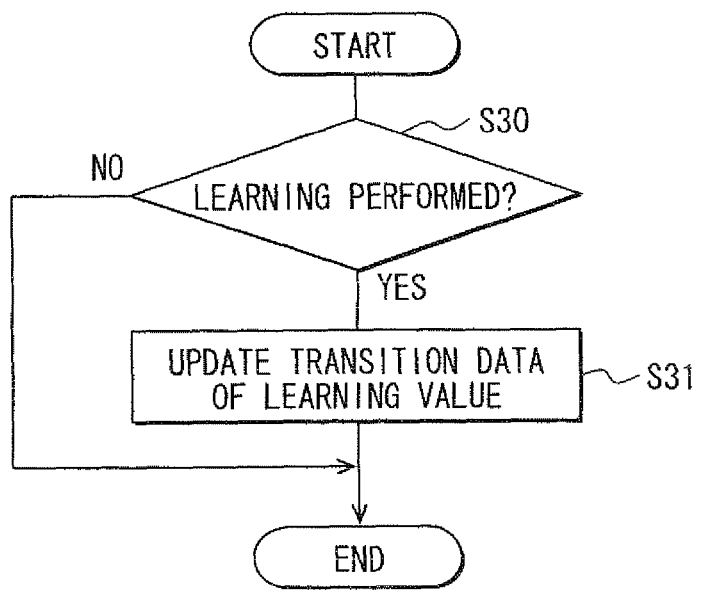
FIG. 7 is a flowchart illustrating storing processing of learning value transition data according to the embodiment.

FIG. 7 shows processing repeatedly performed by the microcomputer of the ECU 30. First in S30, it is determined whether the learning of the above-described various characteristic values td, te, dqmax has been performed. If the learning has been performed, the learning values are obtained, and the transition data (transition lines L1-L4 shown in FIG. 4) of the learning values A1-A4 in FIG. 4 (equivalent to degradation quantitative values) are updated and stored in the EEPROM 25a in S31. Separately from the processing of FIG. 7, the cumulative operation time or the cumulative operation time number of the injector 10 since the injector 10 was used for the first time is stored in the EEPROM 25a.

As mentioned above, the frequency for learning the various characteristic values td, te, dqmax is set relatively high in the relatively early stage of the use. The learning frequency is set high also when the learning value deviates from the normally-assumed degradation progression degree L1 due to a certain cause (refer to dotted lines L2, L3 and L4).

Therefore, information about the degree of the deviation of the learning value from the normally-assumed progression degree of the degradation can be obtained based on the transition data of the learning value stored in S31. Therefore, the transition data can be effectively used for setting the learning frequency, i.e., next learning timing. Information about whether the present time is in the early stage of the use can be obtained based on the data of the cumulative operation time or the cumulative operation time number since the first use stored in the EEPROM 25*a*. Therefore, the data of the cumulative operation time or the cumulative operation time number can be effectively used for setting the learning frequency, i.e., the next learning timing.

Specifically, for each injector 10 of each cylinder, the learning value transition data, the cumulative operation time and the like of the injector 10 are stored in each EEPROM 25*a* of the injector 10. Therefore, when only a part of the multiple injectors 10 is replaced with a new injector 10, the replaced new injector 10 can be configured to perform the learning at a frequency corresponding to the early stage of the use, and the other injectors 10 not replaced can be configured to perform the learning at the frequencies set based on the data stored in the corresponding EEPROMs 25*a*. In such the way, the suitable learning frequency can be set for each injector 10.

Thus, according to the present embodiment, the determination result of the existence/nonexistence of the sudden change in the bulk modulus K at the time when the learning value changes suddenly (or bulk modulus K at the time when learning value changes suddenly) is stored. Therefore, when the defect such as the inability to inject the desired quantity of the fuel arises, the above-described data can be effectively used for analyzing whether the cause of the defect is the use of the inferior fuel.

Moreover, when the injection abnormality occurs, the data of the cumulative operation time or the cumulative operation time number, the data of the use frequency in each area, and the data of the fuel pressure P, the engine rotation speed NE and the fuel injection quantity Q as of the occurrence of the injection abnormality are stored. Therefore, the above-described data can be effectively used for analyzing whether the cause of the injection abnormality is the use of the injector 10 in the severe state or under the severe environment.

The transition data of the characteristic value (learning value) of the injector 10 and the cumulative operation time or the cumulative operation time number of the injector 10 are stored. The above-described data can be effectively used for setting the learning frequency (timing) of the characteristic value.

Furthermore, in the present embodiment, the data storage by the processing shown in FIGS. 5 and 7 is performed for each of the multiple injectors 10. Therefore, the cause analysis of the injection abnormality or the setting of the learning frequency can be performed in accordance with the state of each injector 10. Therefore, wasteful replacement of all the multiple injectors 10 with the new products can be avoided, and excess and deficiency of the learning frequency can be inhibited.

In the present embodiment, the various data obtained by the processing of FIGS. 3, 5 and 7 are stored in the EEPROM 25*a* mounted in each of the injectors 10. If the data are stored in the ECU 30 differently from the present embodiment, a defect analysis worker who received the injector 10 causing the defect cannot obtain the various data unless the worker receives also the ECU 30. Therefore, workability is low in this case. As contrasted thereto, in the present embodiment, the data are stored in the EEPROM 25*a* mounted in each injector 10. Accordingly, the defect analysis worker can obtain the various data without necessitating the reception of the ECU 30, thereby improving the workability of the analysis.

Other Embodiments

The present invention is not limited to the above-described embodiment but may be modified and implemented as follows, for example. Further, characteristic constructions of the embodiment may be combined arbitrarily.

In the above-described embodiment, the various data useful for the cause analysis of the defect (data stored through processing of FIGS. 3 and 5) and the various data useful for the setting of the learning frequency (data stored through processing of FIG. 7) are stored in the EEPROM 25*a* mounted in each injector 10. Alternatively, these data may be stored in the ECU 30.

In the processing of FIG. 3, the sudden change determination of the bulk modulus K is performed on the condition that the learning value has changed suddenly (S10). Alternatively, the processing of S10 may be abolished, and the sudden change determination of the bulk modulus K may be performed irrespective of the existence/nonexistence of the sudden change in the learning value. The determination result or the bulk modulus K as of the occurrence of the abnormality may be stored in the EEPROM 25*a*.

In the above-described embodiment, the EEPROM 25*a* is fixed to the fuel pressure sensor 20 having the pressure sensor element 22. The present invention is not limited thereto. Alternatively, for example, the EEPROM 25*a* may be fixed to the body 11 or the connector 14.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A data storage device comprising:
    a calculating means for calculating a bulk modulus of fuel injected from a fuel injector of an internal combustion engine;
    a determining means for determining whether a change amount of the calculated bulk modulus per unit time increases and exceeds a predetermined amount;
    a learning means for learning a characteristic value, which indicates an injection characteristic of the fuel injector and which takes different values according to the bulk modulus of the actual fuel; and
    a storing means,
    wherein the determination result of the determining means or the value of the bulk modulus is stored in the storing means at the time when a change amount of the characteristic value per unit time learned by the learning means increases and exceeds a predetermined amount, and a change amount of the calculated bulk modulus per unit time increases and exceeds a predetermined amount.

2. The data storage device as in claim 1,
    wherein the data storage device is applied to the internal combustion engine that injects the fuel, which is distributed from a pressure accumulator, from an injection hole of the fuel injector, the data storage device further comprising:
    a fuel pressure sensor, arranged in a fuel passage extending from a discharge port of the pressure accumulator to the injection hole, for sensing fuel pressure,
    wherein the calculating means calculates the bulk modulus, which is used by the determining means, based on the sensed pressure sensed with the fuel pressure sensor.

3. The data storage device as in claim 1,
    wherein the storing means is mounted in the fuel injector.

* * * * *